(12) United States Patent
Kataoka et al.

(10) Patent No.: US 8,336,695 B2
(45) Date of Patent: Dec. 25, 2012

(54) POWER TRANSMITTING APPARATUS

(75) Inventors: Makoto Kataoka, Shizuoka (JP); Shunichi Itou, Shizuoka (JP); Katsu Yoshimoto, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 1139 days.

(21) Appl. No.: 12/209,951

(22) Filed: Sep. 12, 2008

(65) Prior Publication Data

US 2009/0071789 A1 Mar. 19, 2009

(30) Foreign Application Priority Data

Sep. 12, 2007 (JP) ................................. 2007-236488

(51) Int. Cl.
*F16D 13/52* (2006.01)
(52) U.S. Cl. ...................................... 192/70.2
(58) Field of Classification Search ................ 192/70.2, 192/107 R, 70.23, 89.21, 109 R
See application file for complete search history.

(56) References Cited

U.S. PATENT DOCUMENTS

| | | | | |
|---|---|---|---|---|
| 5,617,938 A * | 4/1997 | Tsukada et al. | ............... | 192/54.5 |
| 7,011,199 B2 * | 3/2006 | Onishi et al. | ............. | 192/48.611 |
| 7,063,197 B2 * | 6/2006 | Merkel et al. | ............... | 192/85.24 |
| 7,237,664 B2 * | 7/2007 | Sugita et al. | ................. | 192/70.2 |
| 2003/0188950 A1 * | 10/2003 | Kinoshita et al. | ......... | 192/109 R |
| 2008/0029332 A1 * | 2/2008 | Gokan et al. | .................. | 180/383 |

\* cited by examiner

*Primary Examiner* — Ha D. Ho
*Assistant Examiner* — Jude Agendia
(74) *Attorney, Agent, or Firm* — Knobbe, Martens, Olson & Bear, LLP

(57) ABSTRACT

A power transmitting apparatus can include a clutch housing rotatable together with an input member and supporting a plurality of driving clutch plates. A clutch member can support a plurality of driven clutch plates alternately arranged between the driving clutch plates via spline fitting and connected to an output member. A pressure member can be mounted on the clutch member and axially movably thereal-ong for carrying out the pressure-contact or release between the driving clutch plates and the driven clutch plates. Back-torque limiting cams can be configured to release the connection between the driving clutch plates and the driven clutch plates when the rotation speed of the output member has exceeded that of the input member. A rotational force input to the input member can be transmitted to or cut-off from the output member by carrying out the pressure-contact or release between the driving clutch plates and the driven clutch plates. The driven clutch plates can be supported by a two-part structure in which some of the driven clutch plates are supported on the clutch member by a spline fitting portion and the other driven clutch plates are supported on the pressure member by a spline fitting portion. The power transmitting apparatus can further comprise a device or assembly configured to preventing slipping-off of the driven clutch plates into a separated portion between the spline fitting portion of the clutch member and the spline fitting portion of the pressure member.

3 Claims, 10 Drawing Sheets

[Fig 1]
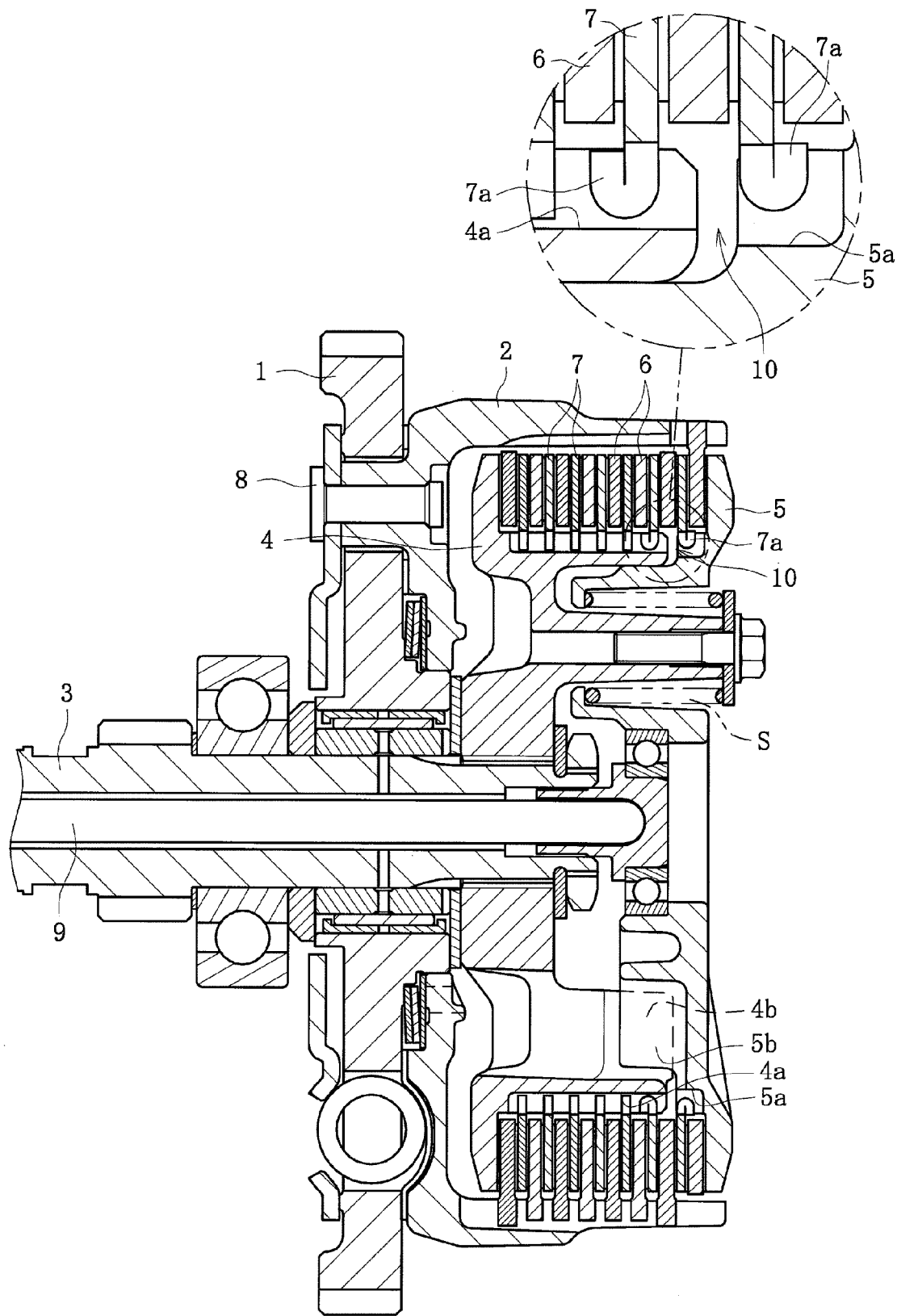

[Fig 2]
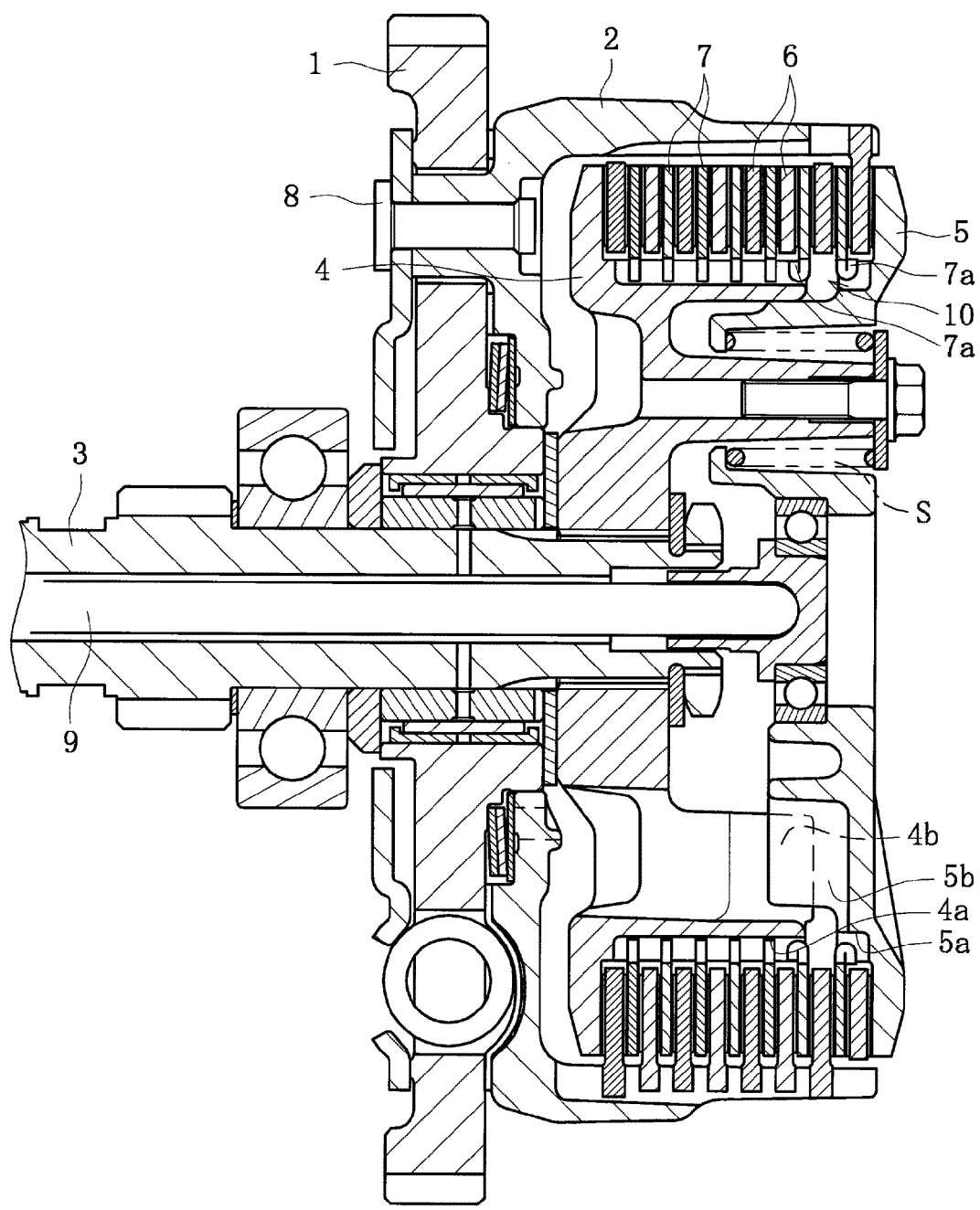

[Fig 3]
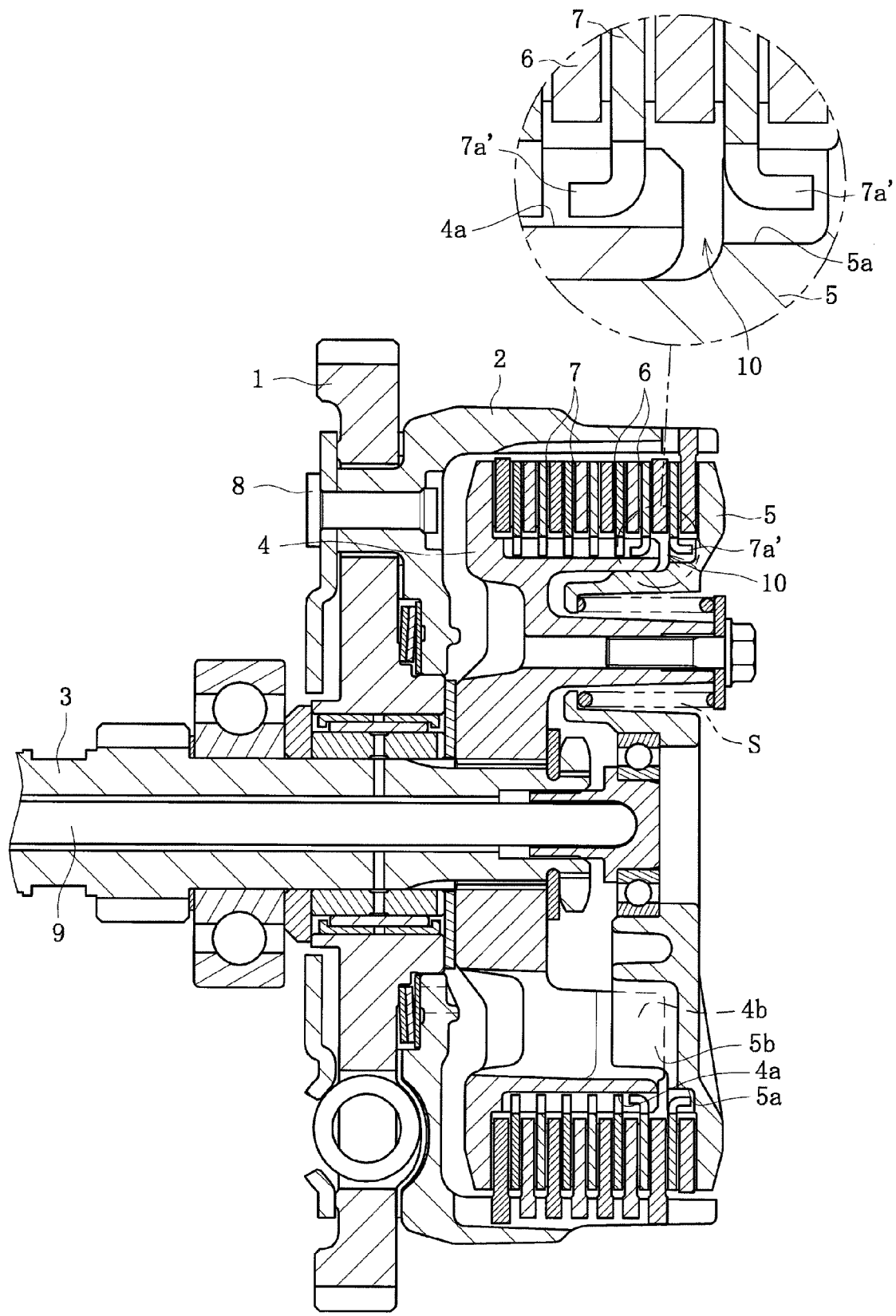

[Fig 4]
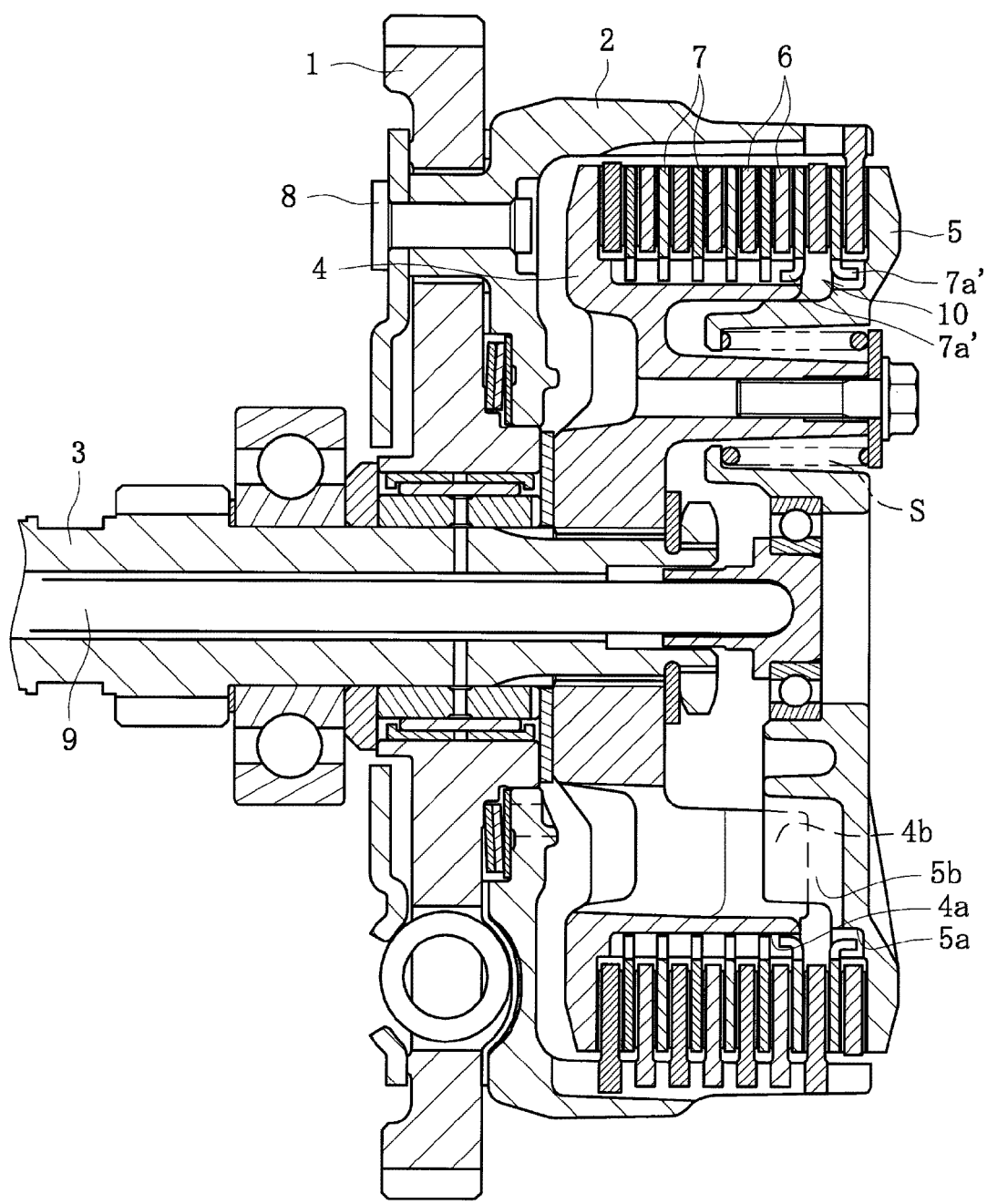

[ Fig 5 ]
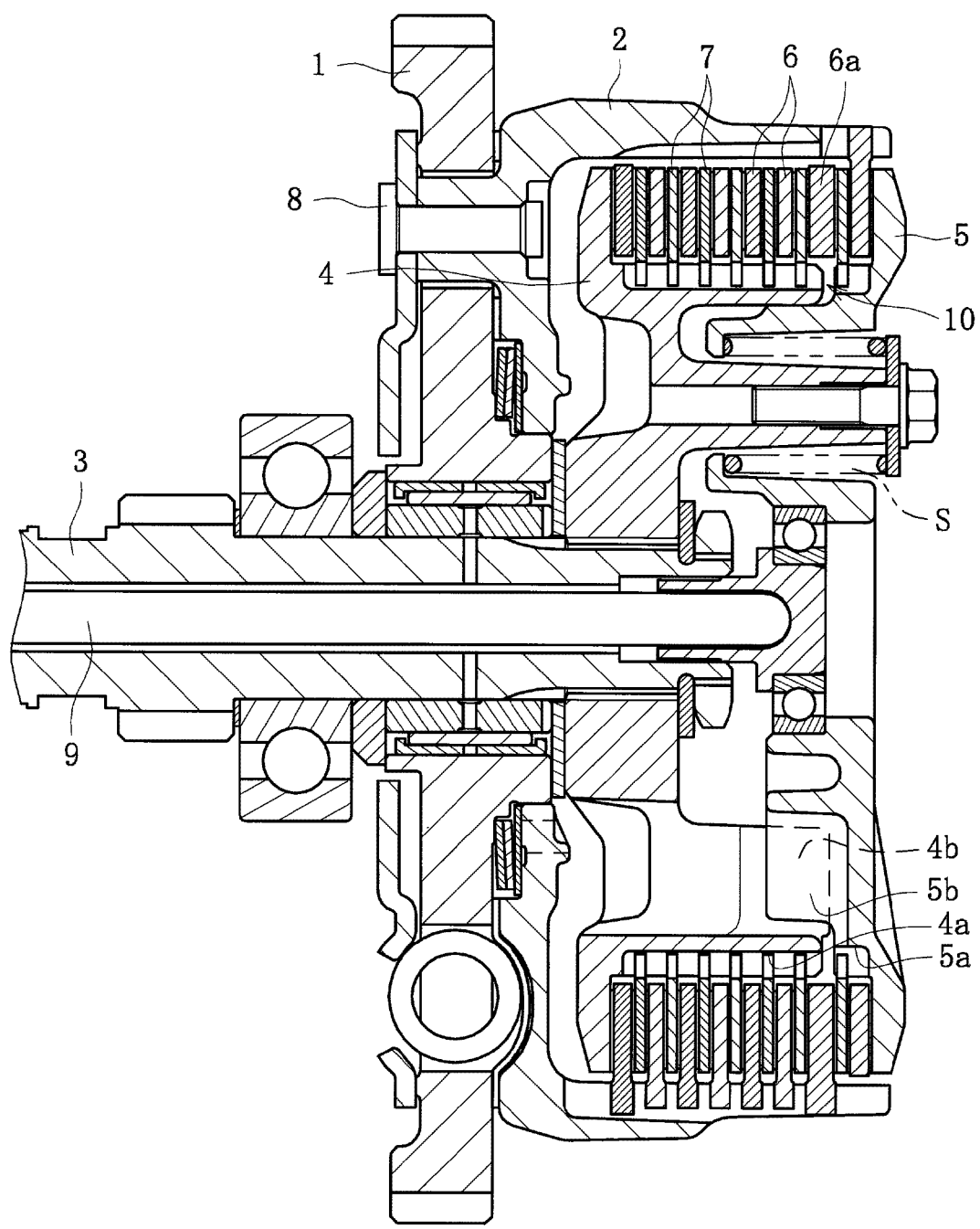

[Fig 6]
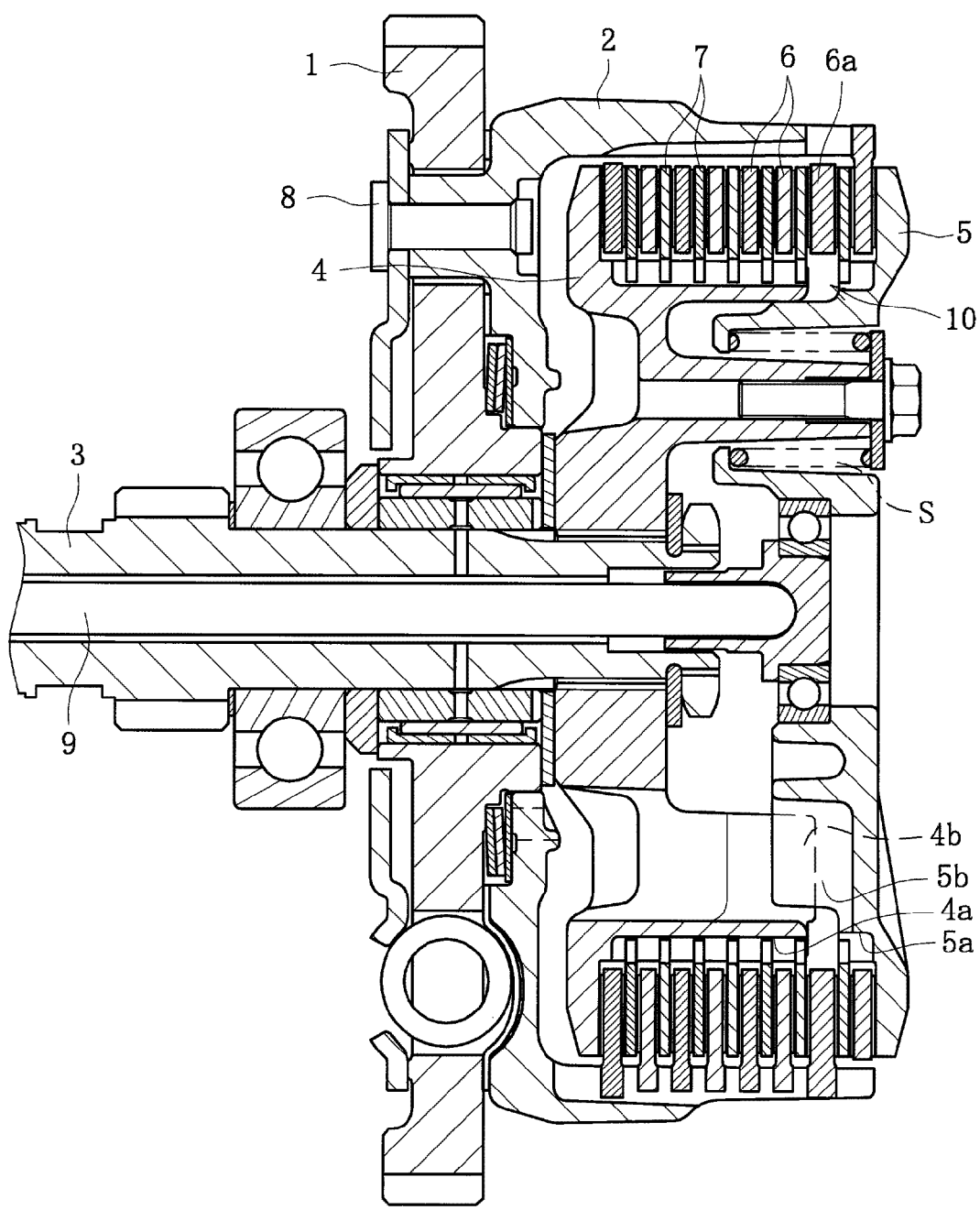

[Fig 7]
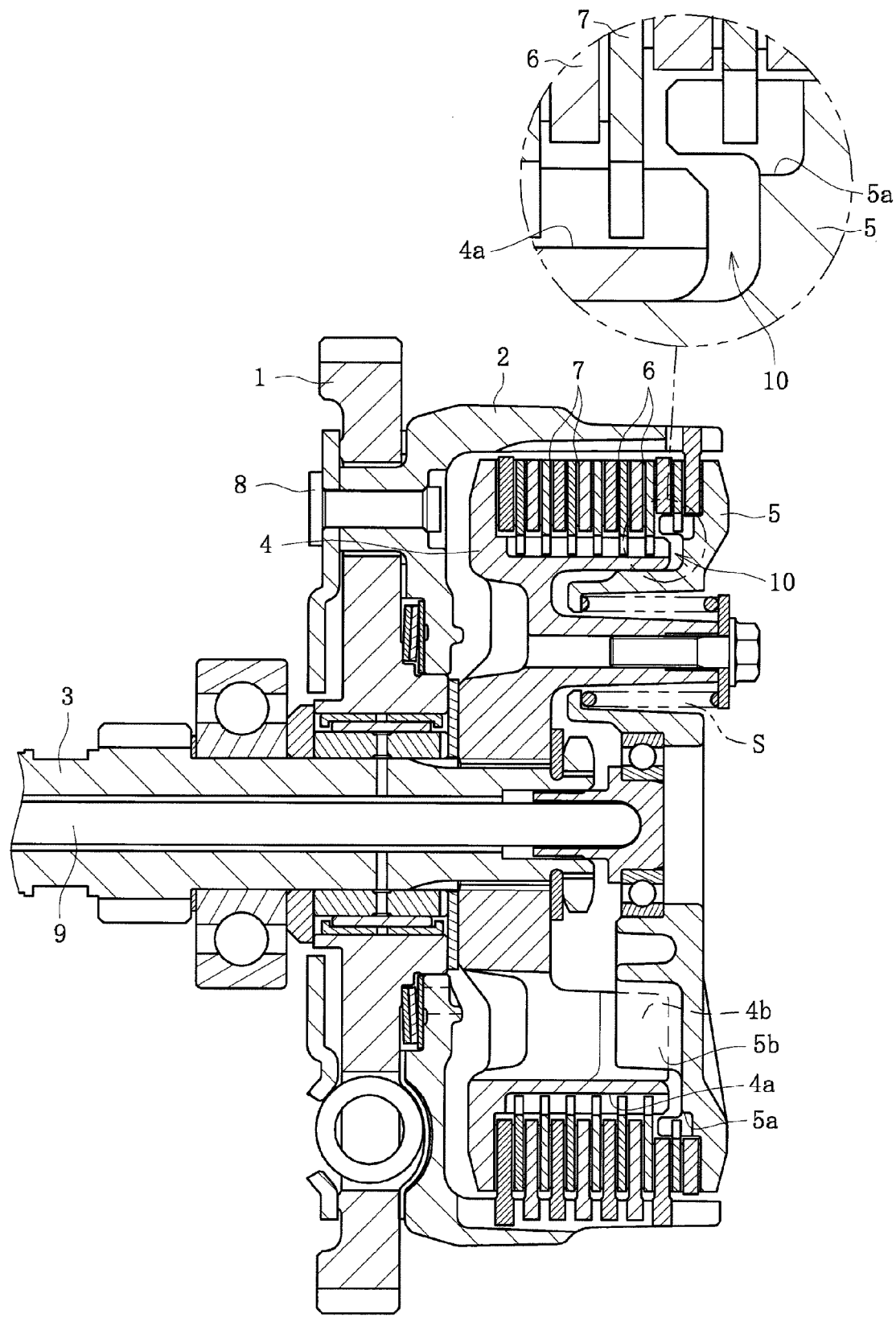

[Fig 8]
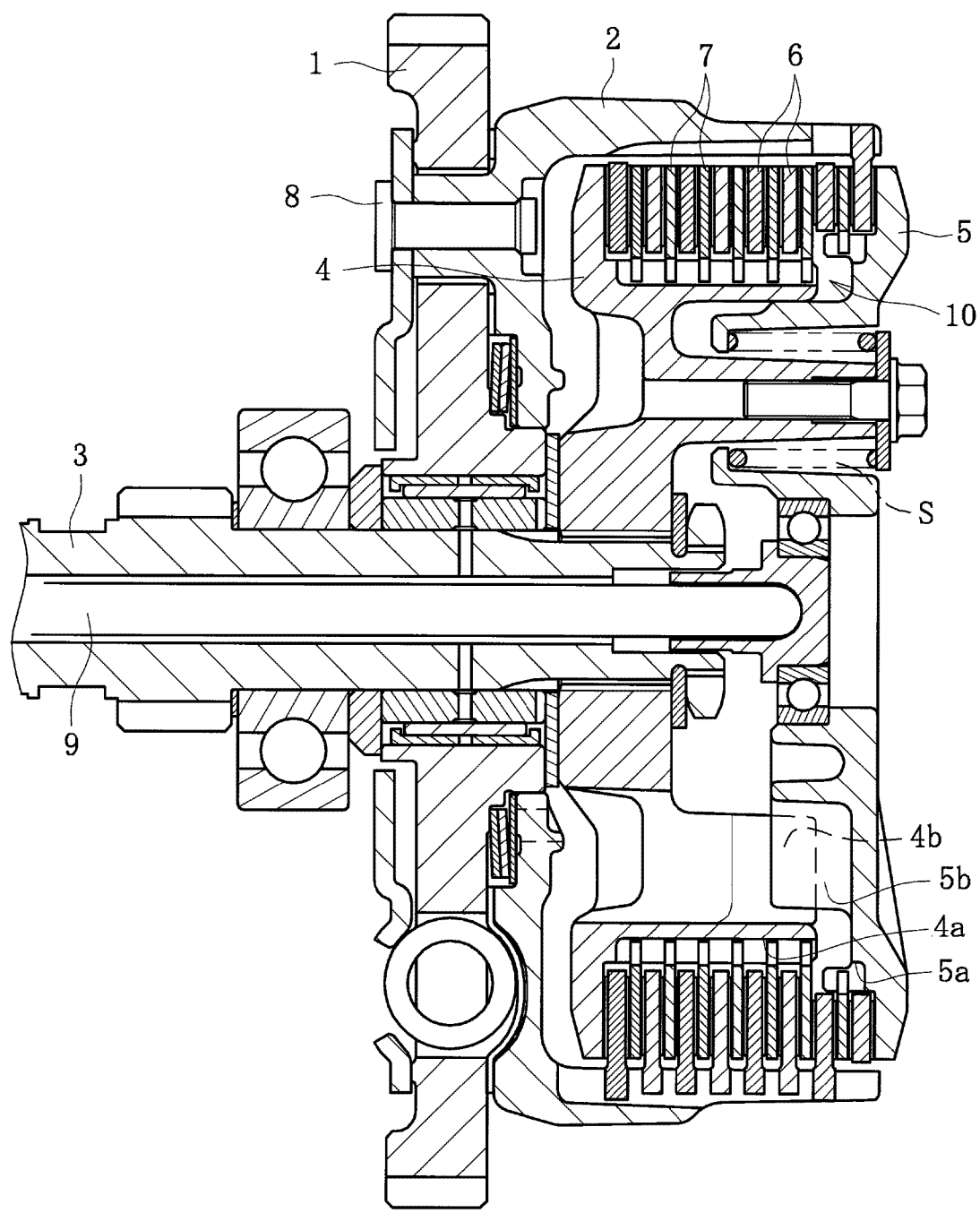

[Fig 9]
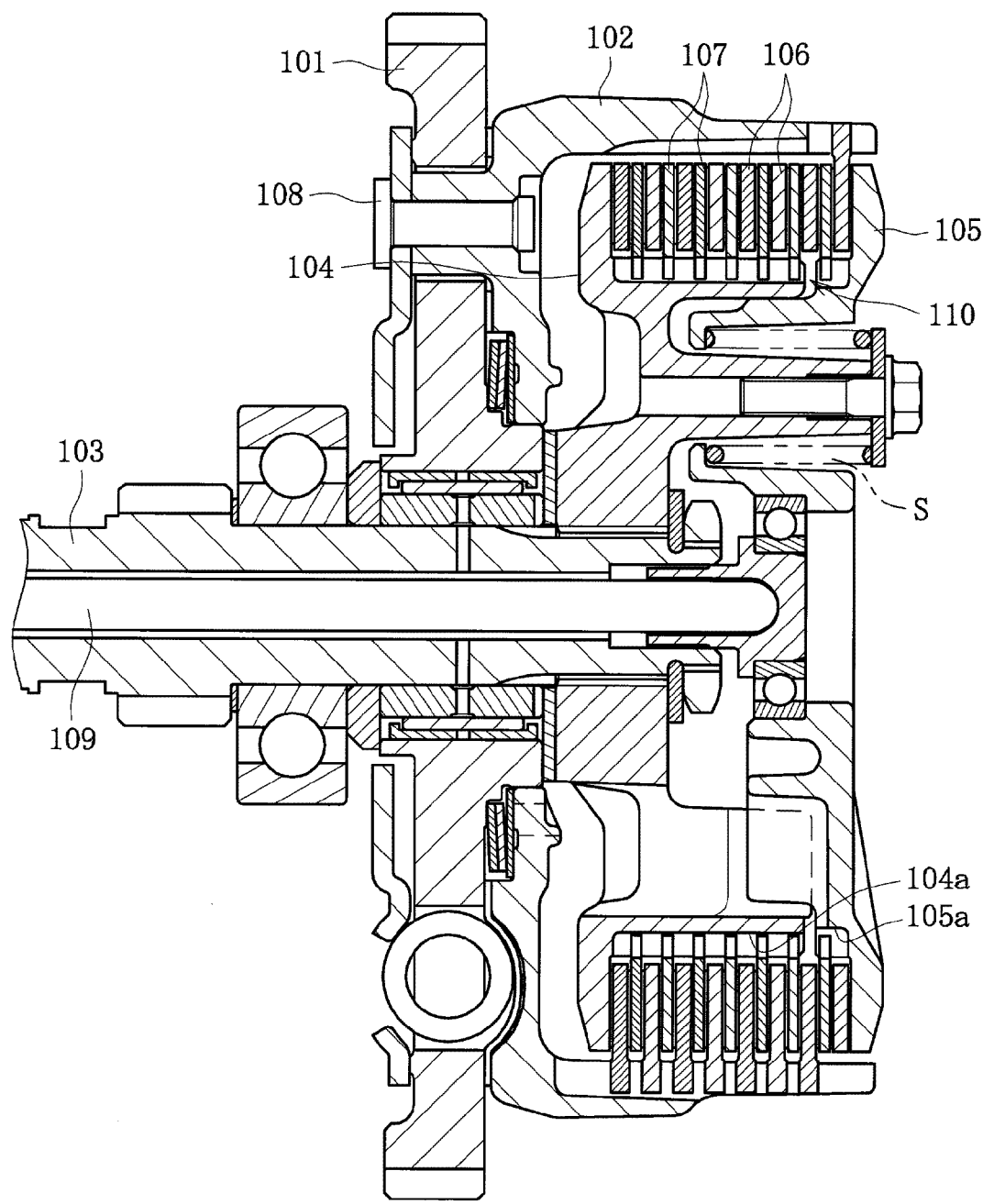
PRIOR ART

[ Fig 10 ]
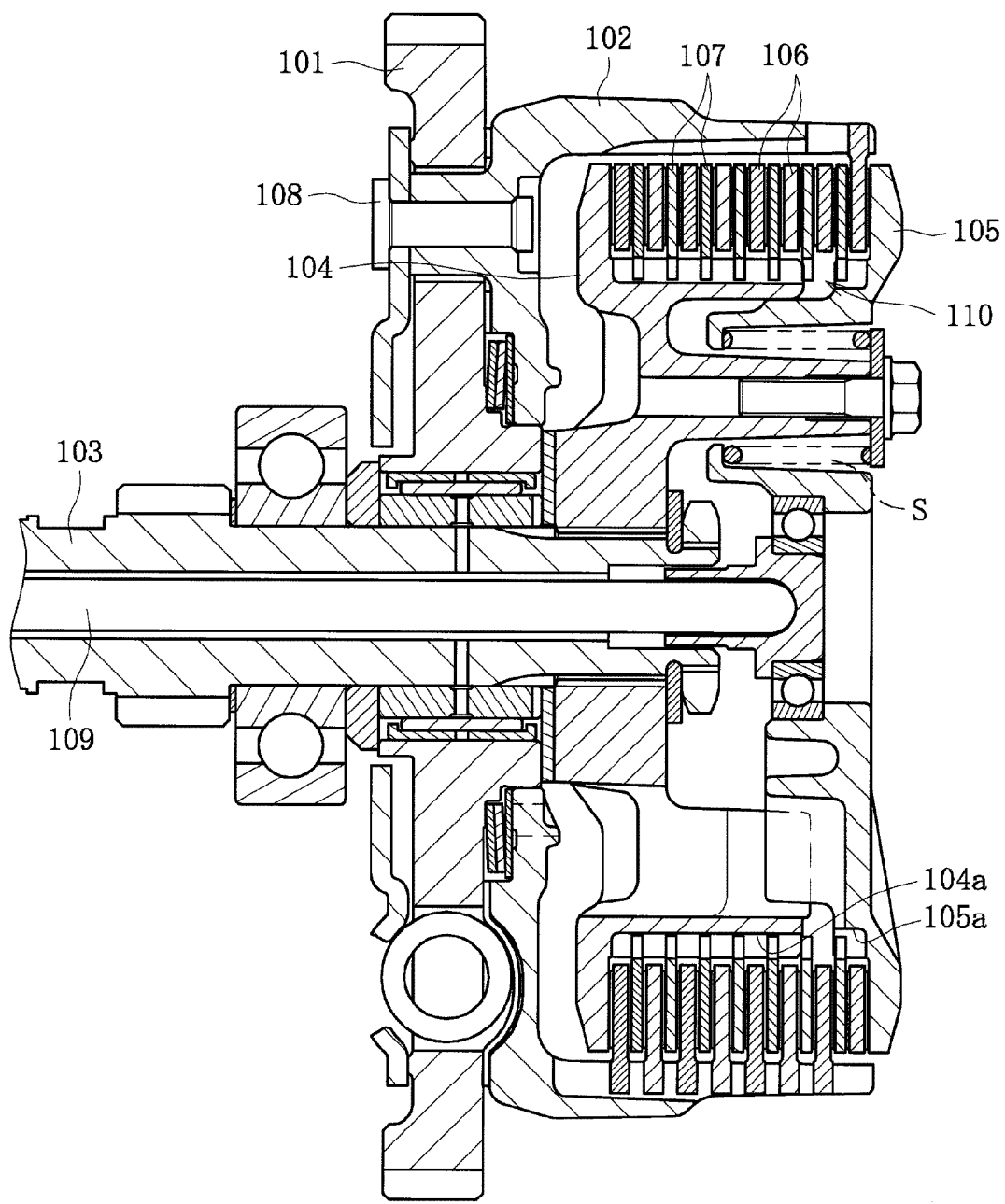
PRIOR ART

POWER TRANSMITTING APPARATUS

PRIORITY INFORMATION

The present application is based on and claims priority under 35 U.S.C. §119(a-d) to Japanese Patent Application No. 2007-236488, filed on Sep. 12, 2007, the entire contents of which is expressly incorporated by reference herein.

BACKGROUND OF THE INVENTIONS

1. Field of the Inventions

The present inventions relate to a power transmitting apparatus for transmitting or cutting-off a rotational force of the input member to the output member.

2. Description of the Related Art

In general, the power transmission apparatuses for motorcycles are intended to arbitrarily transmit or cut off a power of an engine to a transmission and a driving wheel. In other words, such transmissions are designed to allow the transmission or cutting off of power at any time, for example during a gear change. Such transmissions typically comprise an input member connected to an engine side, an output member connecting the transmission to a driving wheel side, and a clutch member connected to the output member. The power can be transmitted by pressure-contacting (pressing together) a plurality of driving clutch plates and cut-off by releasing the pressure-contacting force between the driving clutch plates and driven clutch plates.

For example, a power transmission apparatus can comprise, as shown in FIGS. 9 and 10, a clutch housing 102 on which a gear 101 is formed, a clutch member 104 connected to a shaft 103 as an output member, a pressure member 105 mounted on the clutch member 104 at the right side thereof, driving clutch plates 106 connected to the clutch housing 102, and driven clutch plates 107 connected to the clutch member 104.

As illustrated in FIGS. 9 and 10, a known power transmitting apparatus includes a two-part structure in which some of the driven clutch plates 107 are supported on the clutch member 104 and the other driven clutch plates 107 are supported on the pressure member 105. That is, the driven clutch plates 107 are supported both by a spline fitting portion 104a formed on the clutch member 104 and by a spline fitting portion 105a formed on the pressure member 105.

It is well known that the power transmission is carried out by pressure-contacting the driving clutch plates 106 and the driven clutch plates 107 each other by moving the pressure member 105 to the left direction as shown in FIG. 9 and the power transmission is cut off by releasing the pressure-contacting force between the driving clutch plates 106 and driven clutch plates 107. This type of arrangement is well known prior art.

SUMMARY OF THE INVENTIONS

An aspect of at least one of the embodiments disclosed herein includes solutions to the problem that in the power transmitting apparatus of the prior art, as described above with reference to FIGS. 9 and 10, which has the two-part structure in which some of the driven clutch plates are supported on the clutch member and the other driven clutch plates are supported on the pressure member, a problem arises in that the driven clutch plate (or plates) 107 positioned near a separated portion 110 can slip off from the spline fitting portion 104a or 105a into a separated portion 110 between these spline fitting portions 104a, 105a when the power transmission is cut off by moving the pressure member 105 toward the right direction and thus the distance of the separated portion 110 is spread.

In such power transmitting apparatuses that have back-torque limiting cams formed so as to absorb a back-torque when the back-torque is caused by moving (lifting) the pressure member 105 toward a direction for releasing the pressure-contact between the driving clutch plates 106 and the driven clutch plates 107, the separated portion 110 is also spread and thus the driven clutch plates 107 can be easily slipped off into the separated portion 110.

Thus, in accordance with an embodiment, a power transmitting apparatus can comprise a clutch housing rotatable together with an input member and supporting a plurality of driving clutch plates. A clutch member can support a plurality of driven clutch plates alternately arranged between the driving clutch plates via spline fitting and connected to an output member. A pressure member can be mounted on the clutch member so as to be axially movably therealong and configured to provide pressure-contact and release between the driving clutch plates and the driven clutch plates. Back-torque limiting cams can be configured to release the connection between the driving clutch plates and the driven clutch plates when the rotation speed of the output member exceeds that of the input member. A rotational force input to the input member can be transmitted to the output member by pressure-contacting driving clutch plates and the driven clutch plates and the rotational force input to the input member can be cut-off from the output member by releasing the driving clutch plates and the driven clutch plates from each other. The driven clutch plates are supported by a two-part structure in which some of the driven clutch plates are supported on the clutch member by a clutch member spline fitting portion and the other driven clutch plates are supported on the pressure member by a pressure member spline fitting portion. Additionally, means can be provided for preventing slipping-off of the driven clutch plates into a separated portion between the spline fitting portion of the clutch member and the spline fitting portion of the pressure member.

In accordance with another embodiment, a power transmitting apparatus can comprise a clutch housing rotatable together with an input member and supporting a plurality of driving clutch plates. A clutch member can support a plurality of driven clutch plates alternately arranged between the driving clutch plates via spline fitting and connected to an output member. A pressure member can be mounted on the clutch member so as to be axially movably therealong and configured to provide pressure-contact and release between the driving clutch plates and the driven clutch plates. Back-torque limiting cams can be configured to release the connection between the driving clutch plates and the driven clutch plates when the rotation speed of the output member exceeds that of the input member. A rotational force input to the input member can be transmitted to the output member by pressure-contacting driving clutch plates and the driven clutch plates and the rotational force input to the input member can be cut-off from the output member by releasing the driving clutch plates and the driven clutch plates from each other. The driven clutch plates can be supported by a two-part structure in which some of the driven clutch plates are supported on the clutch member by a clutch member spline fitting portion and the other driven clutch plates are supported on the pressure member by a pressure member spline fitting portion. A retainer assembly can be configured to prevent the driven clutch plates from slipping into a separated portion between the spline fitting portion of the clutch member and the spline fitting portion of the pressure member.

In accordance with yet another embodiment, a power transmitting apparatus can comprise a clutch housing rotatable together with an input member and supporting a plurality of driving clutch plates. A clutch member can support a plurality of driven clutch plates alternately arranged between the driving clutch plates via spline fitting and connected to an output member. A pressure member can be mounted on the clutch member so as to be axially movably therealong and can be configured to provide pressure-contact and release between the driving clutch plates and the driven clutch plates. Back-torque limiting cams can be configured to release the connection between the driving clutch plates and the driven clutch plates when the rotation speed of the output member exceeds that of the input member. A rotational force input to the input member can be transmitted to the output member by pressure-contacting driving clutch plates and the driven clutch plates and the rotational force input to the input member can be cut-off from the output member by releasing the driving clutch plates and the driven clutch plates from each other. The driven clutch plates are supported by a two-part structure in which some of the driven clutch plates are supported on the clutch member by a clutch member spline fitting portion and the other driven clutch plates are supported on the pressure member by a pressure member spline fitting portion. Additionally, a spacer can be arranged to prevent the driven clutch plates from slipping into a separated portion between the spline fitting portion of the clutch member and the spline fitting portion of the pressure member.

BRIEF DESCRIPTION OF THE DRAWINGS

Additional advantages and features of the present inventions are apparent from the subsequent description and the appended claims, taken in conjunction with the accompanying drawings, wherein:

FIG. 1 is a longitudinal section view of a power transmitting apparatus of a first embodiment, in a state before lifting of the pressure member;

FIG. 2 is a longitudinal section view of a power transmitting apparatus of the first embodiment, after lifting of the pressure member;

FIG. 3 is a longitudinal section view of a modification of the power transmitting apparatus of a first embodiment, before lifting of the pressure member;

FIG. 4 is a longitudinal section view of a modification of the power transmitting apparatus of the first embodiment, after lifting of the pressure member;

FIG. 5 is a longitudinal section view of a power transmitting apparatus of a second embodiment, in a state before lifting of the pressure member;

FIG. 6 is a longitudinal section view of a power transmitting apparatus of a second embodiment, after lifting of the pressure member;

FIG. 7 is a longitudinal section view of a power transmitting apparatus of a third embodiment, before lifting of the pressure member;

FIG. 8 is a longitudinal section view of a power transmitting apparatus of a third embodiment, after lifting of the pressure member;

FIG. 9 is a longitudinal section view of a power transmitting apparatus of a prior art before lifting of the pressure member;

FIG. 10 is a longitudinal section view of a power transmitting apparatus of a prior art after lifting of the pressure member;

DETAILED DESCRIPTION OF THE PREFERRED EMBODIMENT

With reference to FIGS. 1 and 2, a power transmitting apparatus of a first embodiment can be mounted on a vehicle such as a motorcycle to arbitrarily transmit or cut off the driving force of an engine to a transmission or a driving wheel. As shown in FIGS. 1 and 2, the power transmitting apparatus can comprise a clutch housing 2 on which a gear 1, which can serve as an input member, is mounted. A clutch member 4 can be connected to a shaft 3, which can serve as an output member. A pressure plate 5 can be mounted on the clutch member 4 at its right end (in view of FIG. 1) thereof, with driving clutch plates 6 connected to the clutch housing 2, and driven clutch plates 7 connected to the clutch member 4.

The gear 1 is rotated around the shaft 3 by a driving force (rotational force) transmitted from the engine and is connected to the clutch housing 2 via rivets 8 etc. The clutch housing 2 can be a cylindrical casing member opened at the right end thereof and provided with a plurality of driving clutch plates 6 on the inner circumferential wall thereof. Each of the driving clutch plates 6 can be formed as a substantially annular plate member and adapted to be rotated together with the clutch housing 2 and also to slide axially thereon.

The clutch member 4 can be formed as a cylindrical casing member opened at the right end thereof and adapted to be received within the clutch housing 2. The shaft 3 passes through the center of the clutch member 4 and is connected thereto via a spline connection and thus is rotated by the clutch member 4. An axially extending spline arrangement (spline fitting portion 4a) can be formed on the outer circumferential surface of the clutch member 4. The driven clutch plates 7 can be fitted on the spline fitting portion 4a.

For example, the spline can be formed by alternately arranged projections and grooves around the outer circumferential surface of the clutch member 4. A central bore of each driven clutch plate 7 can be formed with projections and grooves corresponding to those of the clutch member 4 and can be fitted on the clutch member so that the driven clutch plate 7 can axially slide on the clutch member 4 but cannot rotate relative to the clutch member 4.

These driven clutch plates 7 (including driven clutch plates 7 spline fitted on the pressure member 5) are arranged alternately with the driving clutch plates 6 so that mutually adjacent clutch plates 6 and 7 can be pressure-contacted and released. That is, both clutch plates 6 and 7 are allowed to slide axially respectively on the clutch housing 2 and the clutch member 4 and thus pressure-contact each other when pushed by the pressure plate 5 toward a left direction as shown in FIG. 1. When pressed as such, the rotational force can be transmitted from the clutch housing 2 to the clutch member 4 and the shaft 3. On the contrary, when the pressure of the pressure plate 5 is released, the clutch plates 6 and 7 are also released from each other and thus the clutch member 4 does not follow the rotation of the clutch housing 2 and can stop relative to the clutch housing 2 so that no power is transmitted to the shaft 3, as shown in FIG. 2.

In this case, it should be noted that "release" of the clutch plates 6 and 7 means a condition in which the pressure-contact is lost and thus the clutch member 4 can rotate relative to the clutch housing 2 (i.e. a condition in which the driving clutch plates 6 slide relative to the driven clutch plates 7). In this "released" condition, there may or may not be measurable clearance between the clutch plates 6 and 7.

The pressure plate 5 can be arranged at a position closing the opening (the right end) of the clutch member 4 and can be normally urged toward a left direction by the clutch spring S.

The circumferential edge portion of the pressure plate 5 can abut the clutch plate 6 positioned at most right position and the clutch plates 6 and 7 can be normally pressure-contacted each other by the clutch spring S. Accordingly, the clutch housing 2 and the clutch member 4 are kept in a normally connected condition so that the gear 1 can rotate the shaft 3 when the rotational force is input to the gear 1.

An axially extending push rod 9 can be arranged within the shaft 3. The pressure-contact force between the driving and driven clutch plates 6 and 7 can be released when a driver of vehicle operates a push rod 9 to move it toward a right direction (in view of FIG. 1) so as to move the pressure plate 5 toward a right direction against the urging force of the clutch spring S.

When the pressure-contacting force between the driving and driven clutch plates 6 and 7 is released, the rotational force input to the gear 1 and the clutch housing 2 is cut-off and thus is not be transmitted to the shaft 3. That is, the pressure-contact or the release between the plates 6 and 7 can be performed by the axial movement of the push rod 9 and accordingly the pressure plate 5.

The clutch member 4 and the pressure member 5 can be respectively formed with cam surfaces 4b, 5b which are oppositely arranged and pressure-contacted and separated from each other so as to form a pressure-contact assisting cam and a back-torque limiting cam. Under a condition in which the rotation force input to the gear 1 and the clutch housing 2 is transmitted to the shaft 3 via the clutch member 4, the rotation force is applied to the pressure member 5 and thus a force increasing the pressure-contacting force between the driving clutch plates 6 and the driven clutch plates 7 by the action of the pressure-contact assisting cam.

On the other hand, when the rotational speed of the shaft 3 exceeds that of the clutch housing 2 and the back-torque is generated in the power transmitting apparatus, the pressure member 5 is moved by the back-torque limiting cam to release (separate) the driving clutch plates 6 and the driven clutch plates 7. Thus some troubles which would otherwise be caused on the power transmitting apparatus and the power source (e.g. engine) can be avoided.

According to some embodiments, the driven clutch plates 7 are supported by a two-part structure (comprising the spline fitting portion 4a of the clutch member 4 and the spline fitting portion 5a of the pressure member 5) in which some of the driven clutch plates 7 are supported on the clutch member 4 by a spline fitting portion 4a and the other driven clutch plates 7 are supported on the pressure member 5 by a spline fitting portion 5a. Also according to some embodiments, the power transmitting apparatus can further comprise means for preventing slipping-off of the driven clutch plates 7 into a separated portion 10 between the spline fitting portion 4a of the clutch member 4 and the spline fitting portion 5a of the pressure member 5.

The slipping-off preventing means of this embodiment can comprise spline fitted portions 7a, which can serve as spacers or as retainer assemblies, formed by oppositely folding the driven clutch plates 7 positioned near the separated portion 10 (more particularly the driven clutch plates 7 nearest to the separated portion 10 at the side of the spline fitting portion 4a and the driven clutch plates 7 nearest to the separated portion 10 at the side of the spline fitting portion 5a). As shown in FIG. 1, the spline fitted portions 7a is formed by folding back the radially innermost fitting edges of the driven clutch plates 7 each as having a U-shaped configuration.

According to the present embodiment, since the driven clutch plates 7 are formed with the slipping-off preventing means i.e. the fold-back portions 7a, it is possible to prevent the driven clutch plates 7 positioned near the separated portion 10 from being slipped off from the spline fitting portions 4a, 5a into the separated portion 10 although the distance of the separated portion 10 is spread when the pressure member 5 is axially moved (i.e. when the pressure member 5 is shifted from a position of FIG. 1 to a position of FIG. 2) when the power transmission is cut off by releasing the driving clutch plates 6 and the driven clutch plates 7 or when the back-torque limiting cam is operated.

The fold-back portion 7a of U-shaped configuration can also be modified to a folded portion 7a' having an L-shaped configuration as shown in FIGS. 3 and 4. This modification can provide the same or a similar slip-off preventing effect as the fold-back portion 7a of U-shaped configuration.

Similarly to the first embodiments described above, further embodiments of the power transmitting apparatus can also be mounted on a vehicle such as a motorcycle to arbitrarily transmit or cut off the driving force of an engine to a transmission or a driving wheel. As shown in FIGS. 5 and 6, such embodiments of the power transmitting apparatus can comprise a clutch housing 2 on which a gear 1, which can serve as an input member, is mounted. A clutch member 4 can be connected to a shaft 3, which can serve as an output member. A pressure plate 5 can be mounted on the clutch member 4 at its right end (in view of FIG. 5) thereof, with driving clutch plates 6 connected to the clutch housing 2, and driven clutch plates 7 connected to the clutch member 4. The same reference numerals are used to describe the embodiments of FIGS. 5 and 6 as those of similar structural components in the embodiments of FIGS. 1-4 and thus the detail description of them is not repeated below.

The slip-off preventing means of the embodiments of FIGS. 5 and 6 can comprise a driving clutch plate 6a positioned at the separated portion 10 and having a thickness larger than that of the other driving clutch plates 6, which can serve as a spacer or as a retainer assembly. That is, by forming the driving clutch plate 6a arranged at a position corresponding to the separated portion 10 as having a thickness larger than that of the other driving clutch plates 6, it is possible to prevent the driven clutch plates 7 positioned near the separated portion 10 from being slipped off from the spline fitting portions 4a, 5a into the separated portion 10, even though the distance of the separated portion 10 is spread when the pressure member 5 is axially moved (i.e. when the pressure member 5 is shifted from a position of FIG. 5 to a position of FIG. 6) when the power transmission is cut off by releasing the driving clutch plates 6 and the driven clutch plates 7 or when the back-torque limiting cam is operated. According to such embodiments, it is possible to prevent more firmly and simpler way the driven clutch plates 7 positioned near the separated portion 10 from being slipped off from the spline fitting portions 4a, 5a into the separated portion 10 by a simpler structure.

Similarly to the embodiments described above with reference to FIGS. 1-6, further embodiments of the power transmitting apparatus can also be mounted on a vehicle such as a motorcycle to arbitrarily transmit or cut off the driving force of an engine to a transmission or a driving wheel. As shown in FIGS. 7 and 8, the power transmitting apparatus can comprise a clutch housing 2 on which a gear 1, which can serve as an input member, is mounted. A clutch member 4 can be connected to a shaft 3, which can serve as an output member. A pressure plate 5 can be mounted on the clutch member 4 at its right end (in view of FIG. 7) thereof, with driving clutch plates 6 connected to the clutch housing 2, and driven clutch plates 7 connected to the clutch member 4. The same reference numerals are used to describe the components of embodiments of FIGS. 7-8 as those of similar structural components in the embodiments of FIGS. 1-6 and thus the detail description of them is not repeated below.

The slip-off preventing means of the embodiments of FIGS. 7 and 8 can comprise a structure, which can serve as a spacer or as retainer assembly, in which the diameter of the spline fitting portion 4a for the driven clutch plates 7 on the clutch member 4 is different from that of the spline fitting portion 5a for the driven clutch plates 7 on the pressure member 5. As such, the spline fitting portions 4a, 5a can be adapted to be moved relative to each other in an overlapped manner.

For example, since the spline fitting portions 4a, 5a are arranged in the overlapped (i.e. telescopic) manner each other as shown in FIG. 7, it is possible to prevent the driven clutch plates 7 positioned near the separated portion 10 from being slipped off from the spline fitting portions 4a, 5a into the separated portion 10 even though the distance of the separated portion 10 is spread when the pressure member 5 is axially moved (i.e. when the pressure member 5 is shifted from a position of FIG. 7 to a position of FIG. 8) when the power transmission is cut off by releasing the driving clutch plates 6 and the driven clutch plates 7 or when the back-torque limiting cam is operated. According to such embodiments, it is possible to prevent more firmly the driven clutch plates 7 positioned near the separated portion 10 from being slipped off from the spline fitting portions 4a, 5a into the separated portion 10.

Although the present inventions have been described with reference to the preferred embodiments, the present inventions are not limited to the illustrated explanations. For example, although the present inventions are illustrated and described in the context of a power transmitting apparatus provided with both the back-torque limiting cams and the pressure-contact assisting cams, the power transmitting apparatus can be used with only a back-torque limiting cam. The power transmitting apparatus of the present inventions can be applied to power transmitting apparatuses of various multiple disc types used for automobiles, three and four wheeled buggies or various generalized machines other than motorcycles.

The present inventions can also be applied to power transmitting apparatuses having different outline configurations or additional functions, for example, if they have a slip-off preventing means of a two-part structure in which some of the driven clutch plates are supported on the spline fitting portion of the clutch member and the other driven clutch plates are supported on the spline fitting portion of the pressure member.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A power transmitting apparatus comprising:
    a clutch housing rotatable together with an input member and supporting a plurality of driving clutch plates;
    a clutch member supporting a plurality of driven clutch plates alternately arranged between the driving clutch plates via spline fitting and connected to an output member;
    a pressure member mounted on the clutch member so as to be axially movably therealong and configured to provide pressure-contact and release between the driving clutch plates and the driven clutch plates; and
    back-torque limiting cams configured to release the connection between the driving clutch plates and the driven clutch plates when the rotation speed of the output member exceeds that of the input member;
    wherein a rotational force input to the input member can be transmitted to the output member by pressure-contacting driving clutch plates and the driven clutch plates and the rotational force input to the input member can be cut-off from the output member by releasing the driving clutch plates and the driven clutch plates from each other;
    wherein the driven clutch plates are supported by a two-part structure in which some of the driven clutch plates are supported on the clutch member by a clutch member spline fitting portion and the other driven clutch plates are supported on the pressure member by a pressure member spline fitting portion; and
    means for preventing slipping-off of the driven clutch plates into a separated portion between the spline fitting portion of the clutch member and the spline fitting portion of the pressure member, wherein said means for preventing slipping-off comprises a structure in which the diameter of the spline fitting portion for the driven clutch plates on the clutch member is different from that of the spline fitting portion for the driven clutch plates on the pressure member so that the spline fitting portions are adapted to be moved each other in an overlapped manner.

2. A power transmitting apparatus comprising:
    a clutch housing rotatable together with an input member and supporting a plurality of driving clutch plates;
    a clutch member supporting a plurality of driven clutch plates alternately arranged between the driving clutch plates via spline fitting and connected to an output member;
    a pressure member mounted on the clutch member so as to be axially movably therealong and configured to provide pressure-contact and release between the driving clutch plates and the driven clutch plates; and
    back-torque limiting cams configured to release the connection between the driving clutch plates and the driven clutch plates when the rotation speed of the output member exceeds that of the input member;
    wherein a rotational force input to the input member can be transmitted to the output member by pressure-contacting driving clutch plates and the driven clutch plates and the rotational force input to the input member can be cut-off from the output member by releasing the driving clutch plates and the driven clutch plates from each other;
    wherein the driven clutch plates are supported by a two-part structure in which some of the driven clutch plates are supported on the clutch member by a clutch member spline fitting portion and the other driven clutch plates are supported on the pressure member by a pressure member spline fitting portion; and a retainer assembly configured to prevent the driven clutch plates from slipping into a separated portion between the spline fitting portion of the clutch member and the spline fitting portion of the pressure member, wherein said retainer assembly comprises a structure in which the diameter of the spline fitting portion for the driven clutch plates on the clutch member is different from that of the spline fitting portion for the driven clutch plates on the pressure member so that the spline fitting portions are adapted to be moved each other in an overlapped manner.

3. A power transmitting apparatus comprising:

a clutch housing rotatable together with an input member and supporting a plurality of driving clutch plates;

a clutch member supporting a plurality of driven clutch plates alternately arranged between the driving clutch plates via spline fitting and connected to an output member;

a pressure member mounted on the clutch member so as to be axially movably therealong and configured to provide pressure-contact and release between the driving clutch plates and the driven clutch plates; and back-torque limiting cams configured to release the connection between the driving clutch plates and the driven clutch plates when the rotation speed of the output member exceeds that of the input member;

wherein a rotational force input to the input member can be transmitted to the output member by pressure-contacting driving clutch plates and the driven clutch plates and the rotational force input to the input member can be cut-off from the output member by releasing the driving clutch plates and the driven clutch plates from each other;

wherein the driven clutch plates are supported by a two-part structure in which some of the driven clutch plates are supported on the clutch member by a clutch member spline fitting portion and the other driven clutch plates are supported on the pressure member by a pressure member spline fitting portion; and a spacer arranged to prevent the driven clutch plates from slipping into a separated portion between the spline fitting portion of the clutch member and the spline fitting portion of the pressure member, wherein said spacer comprises a structure in which the diameter of the spline fitting portion for the driven clutch plates on the clutch member is different from that of the spline fitting portion for the driven clutch plates on the pressure member so that the spline fitting portions are adapted to be moved each other in an overlapped manner.

* * * * *